United States Patent
Maalej et al.

(10) Patent No.: US 11,640,302 B2
(45) Date of Patent: May 2, 2023

(54) SMID PROCESSING UNIT PERFORMING CONCURRENT LOAD/STORE AND ALU OPERATIONS

(71) Applicant: VSORA, Meudon la Foret (FR)

(72) Inventors: Khaled Maalej, Paris (FR); Trung-Dung Nguyen, Massy (FR); Julien Schmitt, Massy (FR); Pierre-Emmanuel Bernard, Antony (FR)

(73) Assignee: VSORA, Meudon la Foret (FR)

( * ) Notice: Subject to any disclaimer, the term of this patent is extended or adjusted under 35 U.S.C. 154(b) by 134 days.

(21) Appl. No.: 17/255,710

(22) PCT Filed: May 21, 2019

(86) PCT No.: PCT/FR2019/051155
§ 371 (c)(1),
(2) Date: Dec. 23, 2020

(87) PCT Pub. No.: WO2020/002782
PCT Pub. Date: Jan. 2, 2020

(65) Prior Publication Data
US 2021/0271488 A1 Sep. 2, 2021

(30) Foreign Application Priority Data
Jun. 29, 2018 (FR) ...................... 18 55998

(51) Int. Cl.
*G06F 9/30* (2018.01)
*G06F 9/38* (2018.01)
(Continued)

(52) U.S. Cl.
CPC .............. *G06F 9/3885* (2013.01); *G06F 7/57* (2013.01); *G06F 9/3004* (2013.01);
(Continued)

(58) Field of Classification Search
CPC . G06F 9/30036; G06F 9/3887; G06F 9/30043
See application file for complete search history.

(56) References Cited

U.S. PATENT DOCUMENTS

| 5,513,366 A | 4/1996 | Agarwal et al. |
| 6,189,094 B1 * | 2/2001 | Hinds ................... G06F 9/3857 712/222 |

(Continued)

FOREIGN PATENT DOCUMENTS

GB 2 407 179 A 4/2005

OTHER PUBLICATIONS

PCT Search Report issued in related application PCT/FR2019/051155, dated Oct. 7, 2019, with English language translation, 6 pages.

*Primary Examiner* — Jacob Petranek
(74) *Attorney, Agent, or Firm* — Faegre Drinker Biddle & Reath LLP

(57) ABSTRACT

A computing device comprising: a plurality of ALUs; a set of registers; a memory; a memory interface between the registers and the memory; a control unit controlling the ALUs by generating: at least one cycle i including both implementing at least one first computing operation by way of an arithmetic logic unit and downloading a first dataset from the memory to at least one register; at least one cycle ii, following the at least one cycle i, including implementing a second computing operation by way of an arithmetic logic unit, for which second computing operation at least part of the first dataset forms at least one operand.

10 Claims, 4 Drawing Sheets

(51) Int. Cl.
*G06F 7/57* (2006.01)
*G06F 15/78* (2006.01)
*G06F 15/80* (2006.01)

(52) U.S. Cl.
CPC ...... *G06F 9/30036* (2013.01); *G06F 15/7842* (2013.01); *G06F 15/8015* (2013.01)

(56) References Cited

U.S. PATENT DOCUMENTS

| | | |
|---|---|---|
| 2004/0015677 A1 | 1/2004 | Moreno et al. |
| 2011/0153707 A1* | 6/2011 | Ginzburg ............ G06F 9/30036 |
| | | 708/523 |
| 2014/0115224 A1* | 4/2014 | Sanghai .............. G06F 9/30007 |
| | | 710/317 |
| 2015/0254076 A1* | 9/2015 | Boettcher ............. G06F 9/3001 |
| | | 712/4 |
| 2019/0171448 A1* | 6/2019 | Chen ..................... G06F 9/3867 |
| 2019/0205137 A1* | 7/2019 | Meadows ............... G06F 9/345 |

* cited by examiner

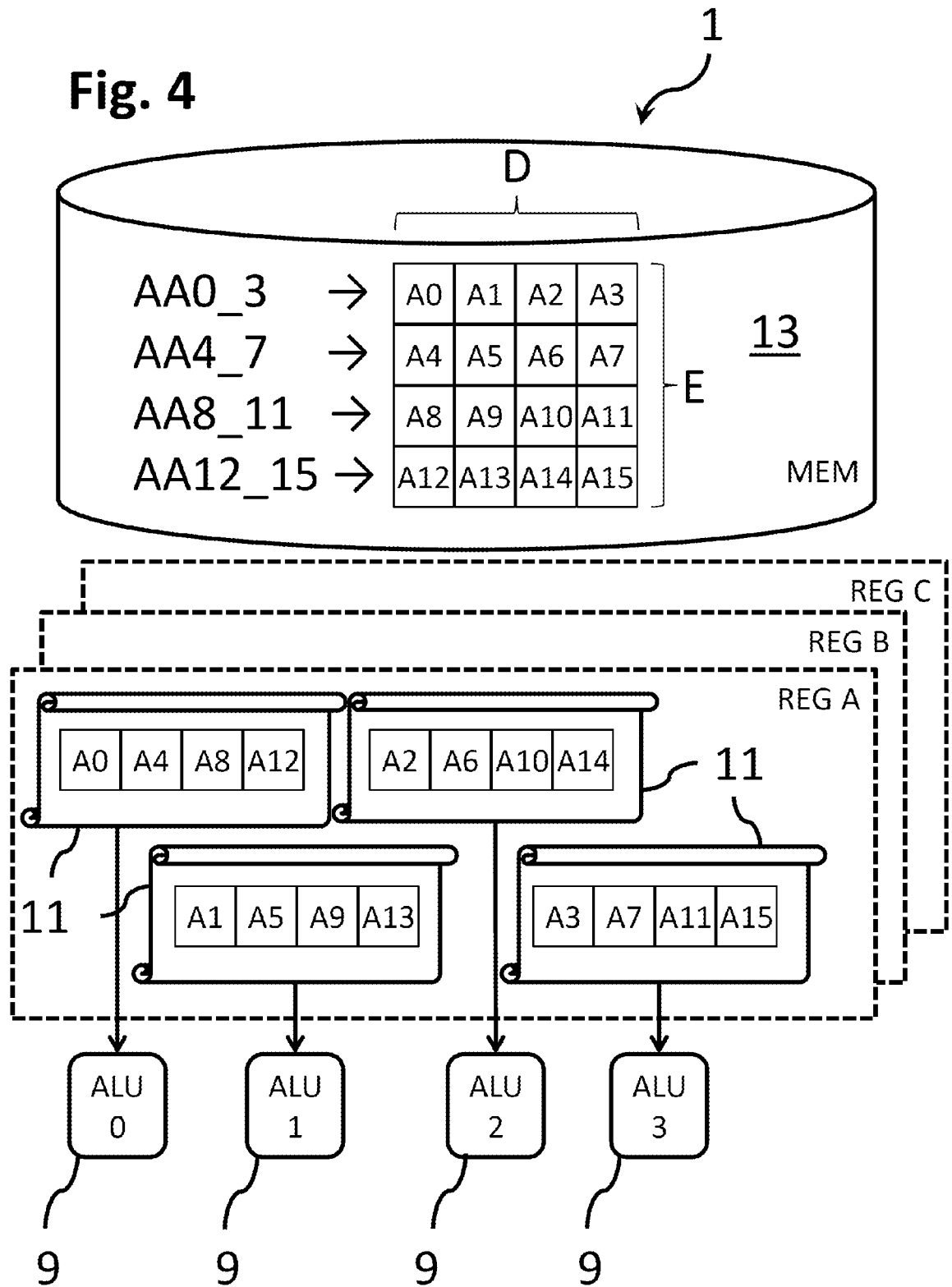

SMID PROCESSING UNIT PERFORMING CONCURRENT LOAD/STORE AND ALU OPERATIONS

CROSS-REFERENCE TO RELATED APPLICATIONS

This application is the U.S. national phase of the International Patent Application No. PCT/FR2019/051155 filed May 21, 2019, which claims the benefit of French Patent Application No. 18 55998 filed Jun. 29, 2018, the entire content of which is incorporated herein by reference.

FIELD

The disclosure relates to the field of processors and to their interactions with the memory units.

BACKGROUND

Conventionally, a computing device comprises a set of one or more processors. Each processor comprises one or more processing units, or PU. Each PU comprises one or more computing units called arithmetic logic units, or ALU. In order to have a high-performance computing device, that is to say one that is fast in order to perform computing operations, it is conventional to provide a high number of ALUs. The ALUs are thus able to process operations in parallel, that is to say at the same time. The unit of time is then a computing cycle. It is therefore common to quantify the computing power of the computing device in terms of a number of operations that it is capable of performing per computing cycle.

However, having a high number of ALUs is inadequate, or even needless, if the elements of the device interacting with the ALUs are not designed (dimensioned) in line with the number of ALUs that it is desired to have operating simultaneously. In other words, if there is a high number of ALUs, the configuration of the environment of the ALUs may be the criterion limiting the power of the device. In particular, the device comprises a memory assembly, itself comprising one or more memory units, each having a fixed number of memory locations at which computing data are able to be permanently stored. During the computing processing operations, the ALUs receive, at input, data from the memory units and supply, at output, data that are for their part stored on the memory units. It is then understood that, in addition to the number of ALUs, the number of memory units is another criterion that determines the computing power of the device.

The data are routed between the ALUs and the memory units, in both directions, by a bus of the device. The term "bus" is used here in its general sense of a system (or interface) for transferring data, including hardware (interface circuit) and the protocols governing the exchanges. The bus transmits the data themselves, addresses and control signals. Each bus itself also has hardware and software limits, such that the routing of the data is limited. The bus in particular has a limited number of ports on the memory unit side and a limited number of ports on the ALUs side. In the present context, it is considered that the memory units are single-port, that is to say that the read and write operations are implemented during different cycles, in contrast to what are called "double-port" memories (more expensive in terms of surface and requiring larger dual control buses for reading and writing). Thus, during a computing cycle, a memory location is accessible via the bus in a single direction (in "read" mode or in "write" mode). Furthermore, during a computing cycle, a memory location is accessible only to a single ALU. As a variant, the proposed technical solutions may be implemented with what are called "double-port" memories. In such embodiments, read and write operations may be implemented during one and the same computing cycle.

Between the bus and the ALUs, a computing device generally comprises a set of registers and local memory units, which may be seen as memories separate from the abovementioned memory units. For ease of understanding, a distinction is drawn here between "registers", intended to store data as such, and "local memory units", intended to store memory addresses. Each register is assigned the ALUs of a PU. A PU is assigned a plurality of registers. The storage capacity of the registers is highly limited in comparison with the memory units, but their content is accessible directly to the ALUs.

To perform computing operations, each ALU generally has to first of all obtain the input data of the computing operation, typically the two operands of an elementary computing operation. A "read" operation on the corresponding memory location via the bus in order to import each of the two operands onto a register is therefore implemented. The ALU then performs the computing operation itself based on the data from a register and by exporting the result in the form of an item of data onto a register. Lastly, a "write" operation is implemented in order to record the result of the computing operation in a memory location. During such a write operation, the result stored on the register is recorded in a memory location via the bus. Each of the operations consumes a priori one or more computing cycles.

In known computing devices, it is common to attempt to execute a plurality of operations (or a plurality of instructions) during one and the same computing cycle, in order to reduce the total number of computing cycles and therefore to increase efficiency. Reference is then made to parallel "processing chains" or "pipelines". However, there are often numerous mutual dependencies between the operations. For example, it is impossible to perform an elementary computing operation for as long as the operands have not been read and they are not accessible on a register for the ALU. Implementing processing chains therefore involves checking the mutual dependency between the operations (instructions), this being complex and therefore expensive.

A plurality of independent operations are usually implemented during one and the same computing cycle. Generally, for a given ALU and during one and the same computing cycle, it is possible to perform a computing operation and a read or write operation. By contrast, for a given ALU and during one and the same computing cycle, it is impossible to simultaneously perform a read operation and a write operation (in the case of single-port memory units). On the other hand, memory access operations (the bus) do not make it possible to perform read or write operations for two ALUs that are separate from one another during one and the same computing cycle and for a given memory location.

To ensure that each ALU is as active as possible (without a lost computing cycle), it is therefore instinctive to attempt to achieve a situation in which, at each computing cycle, three memory locations are accessible for each of the ALUs: two that are intended to supply operands to two inputs of the ALU (read mode) and one for receiving an elementary computing operation result from the ALU (write mode). The two read operations are thus selected in order to obtain (stored on a register) the operands required for the elementary computing operation to be implemented during the following computing cycle. To improve computing power, it is therefore instinctive to provide both a high number of ALUs and a proportional number of memory locations (for example at least three times more memory locations than ALUs).

However, the increase in the number of ALUs and in the number of memory units increases the complexity of the interactions between these two types of element. Increasing the number of ALUs of the device and of memory units able to be connected thereto leads to a non-linear increase in the complexity of the bus. Increasing the number of ALUs and the number of memory units is therefore complex and expensive.

The disclosed embodiments improve the situation.

SUMMARY

Disclosed is a computing device comprising:
a plurality of arithmetic logic units;
a set of registers able to supply data of operand type to the inputs of said arithmetic logic units and able to be supplied with data from the outputs of said arithmetic logic units;
a memory;
a memory interface by way of which data are transmitted and routed between the registers and the memory;
a control unit configured so as to control the arithmetic logic units in accordance with a processing chain microarchitecture such that the arithmetic logic units perform computing operations in parallel with one another, the control unit furthermore being designed to control the memory access operations by way of the memory interface. The control operations generate:
at least one cycle i including both implementing at least one first computing operation by way of an arithmetic logic unit and downloading a first dataset from the memory to at least one register;
at least one cycle ii, following the at least one cycle i, including implementing a second computing operation by way of an arithmetic logic unit, for which second computing operation at least part of the first dataset forms at least one operand.

Such a device makes it possible, in a single operation, to read a dataset from a memory unit and to temporarily store said data on a register. All of the data read in a computing cycle t cannot all be used in the immediately subsequent computing cycle t+1. In at least some cases, some data from among the read data are needless during said subsequent computing cycle t+1, but are used during a further following computing cycle t+1+n without it being necessary to perform an additional read operation, and therefore without consuming an additional computing cycle.

In the field of parallel data processing using a computing device, the usual approach is to schedule a dedicated memory access operation for reading each of the data required in the next elementary computing operation to be implemented, and only those required for the next elementary computing operation. This usual approach could be called "just-in-time memory access". In such a usual approach, it is considered needless to read (and store on a register) an item of data that is not immediately required. Each memory access operation is thus temporally prior to the elementary computing operation itself (imperative) but scheduled directly and only on the basis of the next elementary computing operation. The applicant has gone against the a priori in the field by implementing a different approach.

The applicant thus proposes an approach in which, upon each read operation, the number of data read is greater than the number of data strictly necessary to implement the next computing operation. By opposition, such an approach could be called "provisional memory access". It is then possible for one item of data from among the read data to be used for a future computing operation, other than the computing operation implemented immediately after the read operation. In such cases, the necessary data have been obtained during a single memory access operation (with an increase in the bandwidth of the memory), whereas the usual approach would have required at least two separate memory access operations. The effect of the approach proposed by the applicant, at least in some cases, is therefore that of reducing the consumption of computing cycles for the memory access operations, and therefore it makes it possible to improve the efficiency of the device. Over the long term (a plurality of consecutive computing cycles), the number of memory access operations (in read mode and/or in write mode) is reduced.

This approach does not rule out losses: some of the data that are read and stored on a register may be lost (erased by other data then stored on the same register) even before having been used in a computing operation. However, over a large number of computing operations and computing cycles, the applicant observed an improvement in performance, including in the absence of selecting the read datasets. In other words, even in the absence of selecting the read data (or random selection), this approach makes it possible to statistically improve the efficiency of the computing device in comparison with the usual approach.

According to another aspect, what is proposed is a data processing method implemented by a control unit of a computing device, said device comprising:
a plurality of arithmetic logic units;
a set of registers able to supply data of operand type to the inputs of said arithmetic logic units and able to be supplied with data from the outputs of said arithmetic logic units;
a memory;
a memory interface by way of which data are transmitted and routed between the registers and the memory;
the control unit configured so as to control the arithmetic logic units in accordance with a processing chain microarchitecture such that the arithmetic logic units perform computing operations in parallel with one another, the control unit furthermore being designed to control the memory access operations by way of the memory interface; The method comprises at least:
generating a cycle i including both implementing at least one first computing operation by way of an arithmetic logic unit and downloading a first dataset from the memory to at least one register;
generating a cycle ii, following the cycle i, including implementing a second computing operation by way of an arithmetic logic unit, for which second computing operation at least part of the first dataset forms at least one operand.

According to another aspect, what is proposed is a computer program, in particular compilation computer program, comprising instructions for implementing all or part of a method as defined herein when this program is executed by a processor. According to another aspect, what is proposed is a non-transient computer-readable recording medium on which such a program is recorded.

The following features may optionally be implemented. They may be implemented independently of one another or in combination with one another:

The control unit is furthermore configured, prior to controlling the arithmetic units and the memory access operations, so as to implement an identification algorithm for identifying the first dataset to be downloaded during the at least one cycle i on the basis of the second computing operation to be implemented during the at least one cycle ii. This makes it possible to adapt the read data on the basis of the computing operations to be performed, and therefore to improve the relevance of the data in the downloaded first dataset.

The control unit is configured so as to implement two cycles i separate from one another, such that two first datasets separate from one another are downloaded to at least one register, at least part of each of the two first datasets forming an operand for the second computing operation of the at least one cycle ii. This makes it possible, during said at least two cycles, to combine the computing operations and the memory access operations. Thus, at the end of the two cycles i, all of the operands required for the following computing operations may have been downloaded.

The control unit is configured so as to implement a plurality of cycles ii separate from one another, and such that the part of the first dataset forming at least one operand for the second computing operation of a cycle ii is different from one cycle ii to another cycle ii of the plurality. This makes it possible to implement a plurality of elementary computing operations for a single downloaded dataset.

The control unit is configured so as to perform at least two iterations of a series of at least one cycle i, and one cycle ii, said two iterations being at least partly superimposed such that at least one cycle ii of the first iteration forms a cycle i of the following iteration. This makes it possible to perform computing operations and memory access operations over a particularly limited number of computing cycles, and therefore to further increase efficiency.

The control unit is configured so as to precede a first cycle i with an initialization phase including downloading, from the memory to at least one register, at least one dataset forming operands for the first computing operation of said first cycle i. This makes it possible to initialize the method so as then to repeat the cycles i and ii for each of the datasets to be processed as many times as necessary.

The control unit is furthermore designed to control the memory access operations by way of the memory interface, such that said control operations generate:

during a cycle i, the implementation of a plurality of first computing operations by a plurality of arithmetic logic units;

during a cycle ii, the implementation of a plurality of second computing operations by a plurality of arithmetic logic units, the grouping of the data per dataset to be downloaded being selected so as to match a distribution of the assignments of the computing operations to each of the arithmetic logic units of the plurality, such that said arithmetic logic units have synchronized, asynchronous or mixed operation. This makes it possible to further improve efficiency by adapting the coordinated operation of the ALUs on the basis of the processing operations to be performed and the available resources.

BRIEF DESCRIPTION OF THE DRAWINGS

Other features, details and advantages will become apparent upon reading the detailed description below and on analyzing the appended drawings, in which:

FIG. 4 is a variant of the example from FIG. 3.

DETAILED DESCRIPTION

The drawings and the description below disclose features of various embodiments, not by way of limitation, but to provide a better understanding of the disclosed embodiments.

Figure 1:
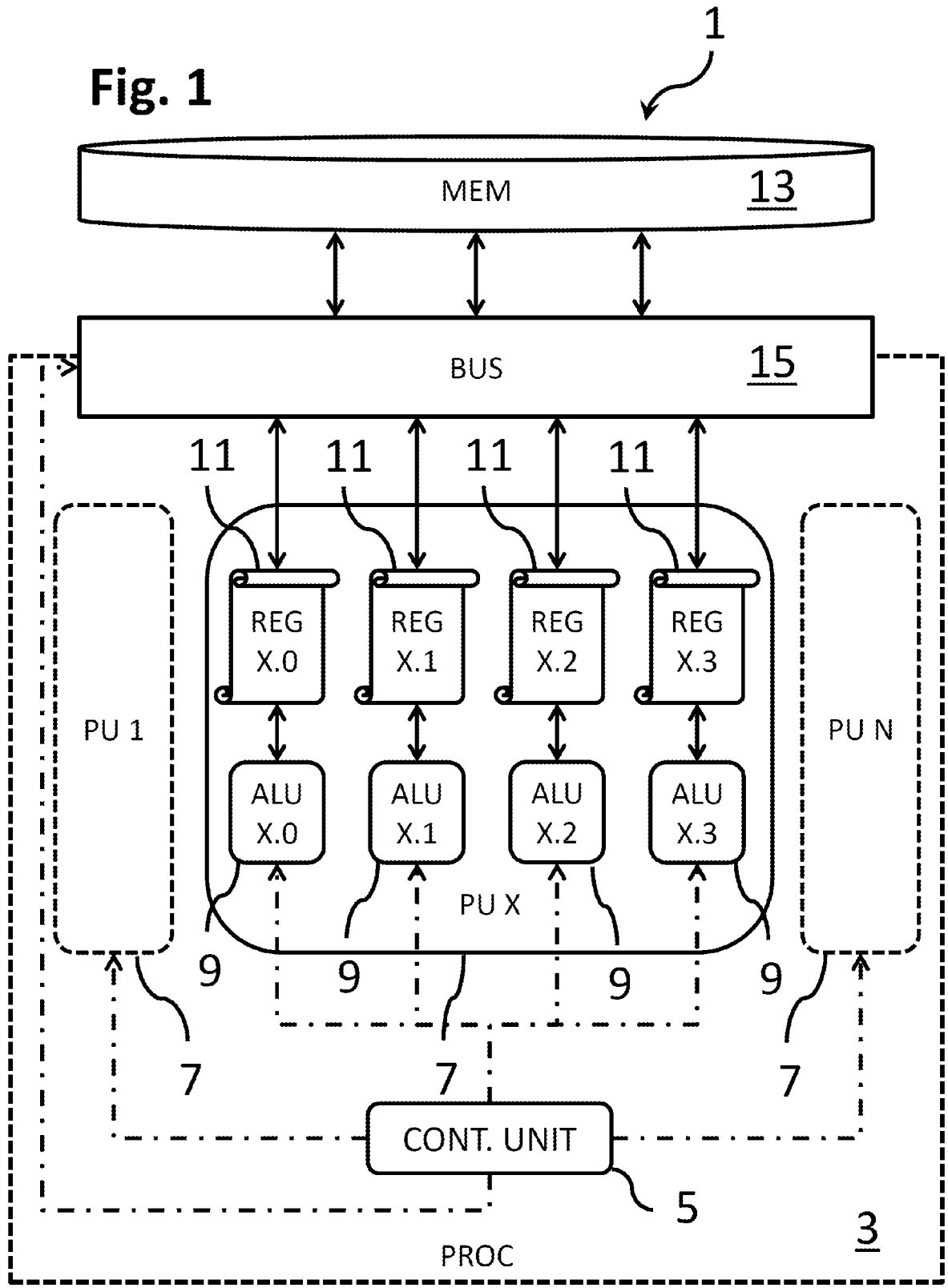
FIG. 1 shows an architecture of a computing device according to an embodiment.

FIG. 1 shows one example of a computing device 1. The device 1 comprises a set of one or more processors 3, sometimes called central processing units or CPUs. The set of processor(s) 3 comprises at least one control unit 5 and at least one processing unit 7, or PU 7. Each PU 7 comprises one or more computing units, called arithmetic logic units 9 or ALU 9. In the example described here, each PU 7 furthermore comprises a set of registers 11. The device 1 comprises at least one memory 13 able to interact with the set of processor(s) 3. To this end, the device 1 furthermore comprises a memory interface 15, or "bus".

In the present context, it is considered that the memory units are single-port, that is to say that the read and write operations are implemented during different cycles, in contrast to what are called "double-port" memories (more expensive in terms of surface and requiring larger dual control buses for reading and writing). As a variant, the proposed technical solutions may be implemented with what are called "double-port" memories. In such embodiments, read and write operations may be implemented during one and the same computing cycle.

FIG. 1 shows three PUs 7: PU 1, PU X and PU N. Only the structure of PU X is shown in detail in order to simplify FIG. 1. However, the structures of the PUs are analogous to one another. In some variants, the number of PUs is different. The device 1 may comprise a single PU, two PUs or more than three PUs.

In the example described here, the PU X comprises four ALUs: ALU X.0, ALU X.1, ALU X.2 and ALU X.3. In some variants, the PUs may comprise a number of ALUs different from one another and/or other than four, including a single ALU. Each PU comprises a set of registers 11, here at least one register 11 assigned to each ALU. In the example described here, the PU X comprises a single register 11 per ALU, that is to say four registers referenced REG X.0, REG X.1, REG X.2 and REG X.3 and assigned respectively to ALU X.0, ALU X.1, ALU X.2 and ALU X.3. In some variants, each ALU is assigned a plurality of registers 11.

Each register 11 is able to supply operand data to the inputs of said ALUs 9 and is able to be supplied with data from the outputs of said ALUs 9. Each register 11 is furthermore able to store data from the memory 13 obtained by way of the bus 15 through what is called a "read" operation. Each register 11 is furthermore able to transmit stored data to the memory 13 and by way of the bus 15 through what is called a "write" operation. The read and write operations are managed by controlling the memory access operations from the control unit 5.

The control unit 5 imposes the way in which each ALU 9 performs the elementary computing operations, in particular their order, and assigns each ALU 9 the operations to be executed. In the example described here, the control unit 5 is configured so as to control the ALUs 9 in accordance with a processing chain microarchitecture, such that the ALUs 9 perform computing operations in parallel with one another. For example, the device 1 has a single instructions flow and multiple data flow architecture, called SIMD for "single instructions multiple data", and/or a multiple instructions flow and multiple data flow architecture, called MIMD for "multiple instructions multiple data". On the other hand, the control unit 5 is furthermore designed to control the memory access operations by way of the memory interface 15 and in particular, in this case, the read and write operations. The two types of control (computing and memory access) are shown by arrows in broken lines in FIG. 1.

Figure 2:
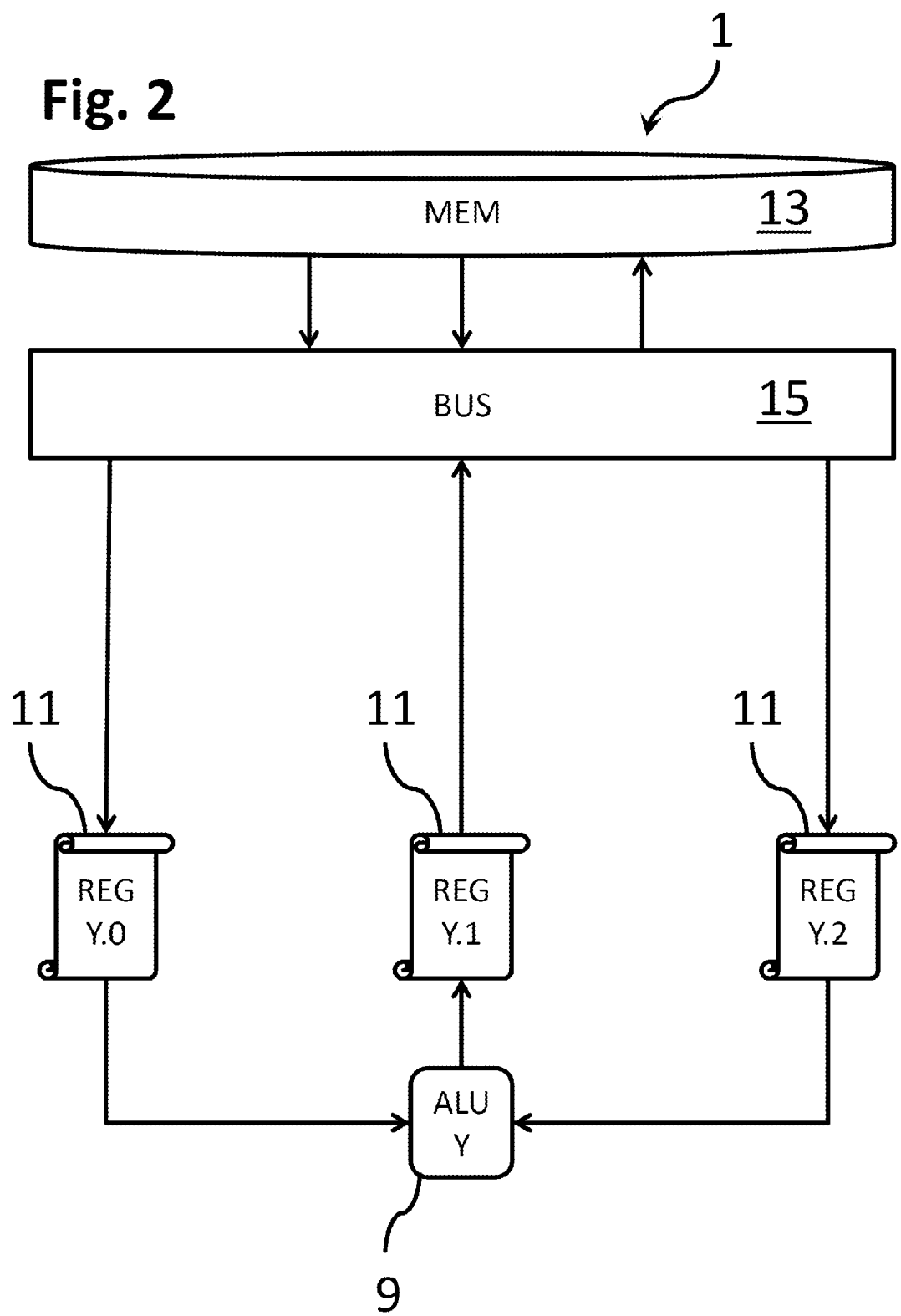
FIG. 2 is a partial depiction of an architecture of a computing device according to an embodiment.

Reference is now made to FIG. 2, in which a single ALU Y is shown. The data transmissions are shown by arrows in unbroken lines. Since data are transmitted step-by-step, it is understood that FIG. 2 does not necessarily show a time t with simultaneous data transmissions. By contrast, in order for an item of data to be transmitted from a register 11 to an ALU 9, it is necessary for example for said item of data to be transmitted beforehand to said register 11 from the memory 13, in this case via the memory interface 15 (or bus).

In the example of FIG. 2, three registers 11, referenced respectively REG Y.0, REG Y.1 and REG Y.2, are assigned an ALU referenced ALU Y. Each ALU 9 has at least three ports, specifically two inputs and one output. For each operation, at least two operands are received, respectively by the first and the second input. The result of the computing operation is transmitted via the output. In the example shown in FIG. 2, the operands received at input originate respectively from the register REG Y.0 and from the register REG Y.2. The result of the computing operation is written to the register REG Y.1. Once it has been written to the register REG Y.1, the result (in the form of an item of data) is written to memory 13, via the memory interface 15. In some variants, at least one ALU may have more than two inputs and receive more than two operands for a computing operation.

Each ALU 9 may perform:
- integer arithmetic operations on data (addition, subtraction, multiplication, division, etc.);
- floating-point arithmetic operations on data (addition, subtraction, multiplication, division, inversion, square root, logarithms, trigonometry, etc.);
- logic operations (two's complement, "AND", "OR", "Exclusive OR", etc.).

The ALUs 9 do not directly exchange data with one another. For example, if the result of a first computing operation performed by a first ALU constitutes an operand for a second computing operation to be performed by a second ALU, then the result of the first computing operation should at least be written to a register 11 before being able to be used by an ALU 9.

In some embodiments, the data written to a register 11 are furthermore automatically written to memory 13 (via the memory interface 15), even if said item of data is obtained only to serve as operand and not as a result of a processing process in its entirety.

In some embodiments, the data obtained to serve as operand and having brief relevance (intermediate result of no interest at the end of the processing operation in its entirety) are not automatically written to memory 13, and may be stored only temporarily on a register 11. For example, if the result of a first computing operation performed by a first ALU constitutes an operand for a second computing operation to be performed by a second ALU, then the result of the first computing operation should be written to a register 11. Next, said item of data is transmitted to the second ALU as operand directly from the register 11. It is then understood that the assignment of a register 11 to an ALU 9 may evolve over time, and in particular from one computing cycle to another. This assignment may in particular take the form of addressing data that make it possible at all times to locate the location of an item of data, be this on a register 11 or at a location in the memory 15.

In the following text, the operation of the device 1 is described for a processing operation applied to computing data, the processing operation being broken down into a set of operations, including computing operations performed in parallel by a plurality of ALUs 9 during a time period consisting of a sequence of computing cycles. It is then said that the ALUs 9 are operating in accordance with a processing chain microarchitecture. However, the processing operation implemented by the device 1 and involved here may itself constitute part (or a subset) of a more global computing process. Such a more global process may comprise, in other parts or subsets, computing operations performed in a non-parallel manner by a plurality of ALUs, for example in a series operating mode or in cascade.

The operating architectures (parallel or in series) may be constant or dynamic, for example imposed (controlled) by the control unit 5. The architecture variations may for example depend on the data to be processed and on the current instructions received at input of the device 1. Such dynamic adaptation of the architectures may be implemented as early as the compilation stage, by adapting the machine instructions generated by the compiler on the basis of the type of data to be processed and the instructions when the type of data to be processed and the instructions are able to be deduced from the source code. Such adaptation may also be implemented only at the device 1, or a processor, when it executes a conventional machine code and it is programmed to implement a set of configuration instructions dependent on the data to be processed and the current received instructions.

The memory interface 15, or "bus", transmits and routes the data between the ALUs 9 and the memory 15 in both directions. The memory interface 15 is controlled by the control unit 5. The control unit 5 thus controls access to the memory 13 of the device 1 by way of the memory interface 15.

The control unit 5 controls the (computing) operations implemented by the ALUs 9 and the memory access operations in a coordinated manner. The control by the control unit 5 comprises implementing a sequence of operations broken down into computing cycles. The control comprises generating a first cycle i and a second cycle ii. The first cycle i is temporally before the second cycle ii. As will be described in more detail in the examples below, the second cycle ii may be immediately subsequent to the first cycle i, or else the first cycle i and the second cycle ii may be temporally spaced from one another, for example with intermediate cycles.

The first cycle i comprises:
- implementing a first computing operation by way of at least one ALU 9; and
- downloading a first dataset from the memory 13 to at least one register 11.

The second cycle ii comprises implementing a second computing operation by way of at least one ALU 9. The second computing operation may be implemented by the same ALU 9 as the first computing operation or by a separate ALU 9. At least part of the first dataset downloaded during the first cycle i forms an operand for the second computing operation.

Figure 3:
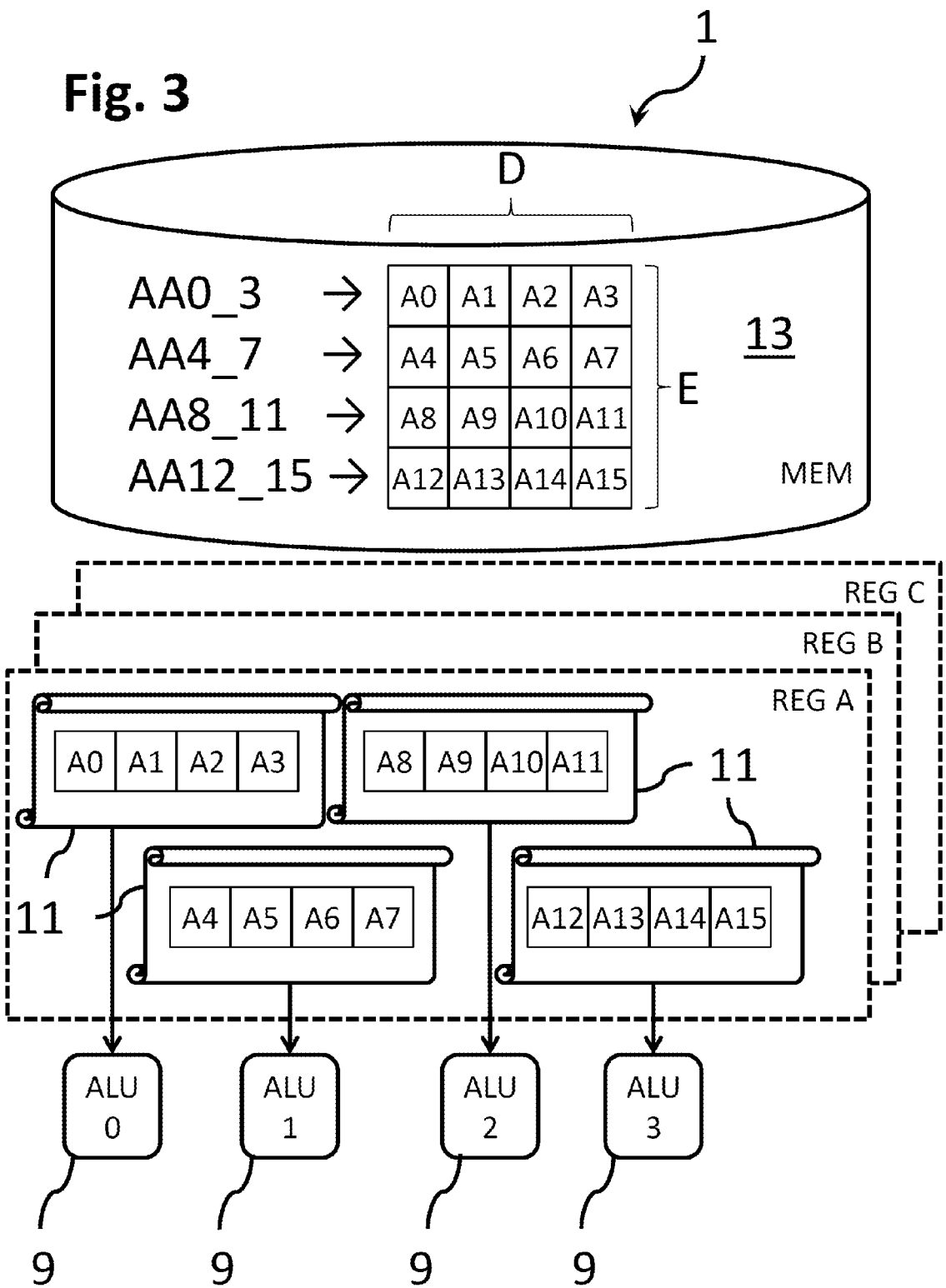
FIG. 3 shows one example of a memory access operation according to an embodiment.

Reference is now made to FIG. 3. Some data, or blocks of data, are referenced respectively A0 to A15 and are stored in the memory 13. In the example, it is considered that the data A0 to A15 are grouped together in fours as follows:

a dataset referenced AA0_3, consisting of the data A0, A1, A2 and A3;

a dataset referenced AA4_7, consisting of the data A4, A5, A6 and A7;

a dataset referenced AA8_11, consisting of the data A8, A9, A10 and A11; and a dataset referenced AA12_15, consisting of the data A12, A13, A14 and A15.

As a variant, the data may be grouped together differently, in particular in groups (or "blocks", or "slots") of two, three or more than four. A dataset may be seen to be a group of data accessible on the memory 13 by way of a single port of the memory interface 15 during a single read operation. Likewise, the data of a dataset may be written to memory 13 by way of a single port of the memory interface 15 during a single write operation.

Thus, during a first cycle i, at least one dataset AA0_3, AA4_7, AA8_11 and/or AA12_15 is downloaded to at least one register 11. In the example in the Figure, each of the datasets AA0_3, AA4_7, AA8_11 and/or AA12_15 is downloaded to a respective register 11, that is to say four registers 11 separate from one another. Each of registers 11 is at least temporarily assigned to a respective ALU 9, here respectively referenced ALU 0, ALU 1, ALU 2 and ALU 3. During this one and the same cycle i, the ALUs 9 may have implemented a computing operation.

During a second cycle ii, each ALU 9 implements a computing operation for which at least one of the items of data stored on the corresponding register 11 forms an operand. For example, the ALU 0 implements a computing operation for which one of the operands is A0. A1, A2 and A3 may be unused during the second cycle ii.

Generally speaking, downloading data from the memory 13 to a register 11 consumes less computing time than implementing computing operations by way of ALUs 9. It may thus generally be considered that a memory access operation (here a read operation) consumes a single computing cycle, whereas implementing a computing operation by way of an ALU 9 consumes a computing cycle or a succession of a plurality of computing cycles, for example four.

In the example of FIG. 3, there are a plurality of registers 11 assigned to each ALU 9, shown by groups of registers 11 referenced REG A, REG B and REG C. The data downloaded from the memory 13 to the registers 11 correspond to the groups REG A and REG B. The group REG C is intended here to store data obtained through computing operations implemented by the ALUs 9 (during a write operation).

The registers 11 of the groups REG B and REG C may thus contain datasets referenced analogously to those of REG A:

the group REG B comprises four registers 11 on which there are respectively stored a dataset BB0_3 consisting of data B0 to B3, a dataset BB4_7 consisting of data B4 to B7, a dataset BB8_11 consisting of data B8 to B11 and a dataset BB12_15 consisting of data B12 to B15;

the group REG C comprises four registers 11 on which there are respectively stored a dataset CC0_3 consisting of data C0 to C3, a dataset CC4_7 consisting of data C4 to C7, a dataset CC8_11 consisting of data C8 to C11 and a dataset CC12_15 consisting of data C12 to C15.

In the example of FIG. 3, the data AN and BN constitute the operands for a computing operation implemented by an ALU 9, whereas the item of data CN constitutes the result, where "N" is an integer between 0 and 15. For example, in the case of an addition, CN=AN+BN. In such an example, the data processing operation implemented by the device 1 corresponds to 16 operations. The 16 operations are independent of one another in the sense that none of the results of the 16 operations is needed to implement one of the other 15 operations.

The implementation of the processing operation (the 16 operations) may therefore for example be broken down as follows, into 18 cycles.

Example 1 cycle #0: read AA0_3;
cycle #1: read BB0_3;
cycle #2: compute C0 (from the set CC0_3) and read AA4_7 (forming for example a cycle i);
cycle #3: compute C1 (from the set CC0_3) and read BB4_7 (forming for example a cycle i);
cycle #4: compute C2 (from the set CC0_3);
cycle #5: compute C3 (from the set CC0_3) and write CC0_3;
cycle #6: compute C4 (from the set CC4_7) and read AA8_11 (forming for example a cycle ii);
cycle #7: compute C5 (from the set CC4_7) and read BB8_11 (forming for example a cycle ii);
cycle #8: compute C6 (from the set CC4_7) (forming for example a cycle ii);
cycle #9: compute C7 (from the set CC4_7) and write CC4_7 (forming for example a cycle ii);
cycle #10: compute C8 (from the set CC8_11) and read AA12_15;
cycle #11: compute C9 (from the set CC8_11) and read BB12_15;
cycle #12: compute C10 (from the set CC8_11);
cycle #13: compute C11 (from the set CC8_11) and write CC8_11;
cycle #14: compute C12 (from the set CC12_15);
cycle #15: compute C13 (from the set CC12_15);
cycle #16: compute C14 (from the set CC12_15);
cycle #17: compute C15 (from the set CC12_15) and write CC12_15.

It is then understood that, with the exception of the initial cycles #0 and #1, the memory access operations (read and write operations) are implemented in parallel with the computing operations, without consuming an additional computing cycle. Reading the datasets containing (a plurality of) data, or blocks of data, rather than reading a single item of data, makes it possible to end the importing of the data from the memory 13 to the registers even before said data become necessary, as operand, for a computing operation.

In the example of cycle #2 above, if only the item of data that is immediately necessary (A0) were to have been read rather than reading the set AA0_3={A0; A1; A2; A3}, then it would have been necessary to subsequently implement three additional read operations in order to obtain A1, A2 and A3.

For better understanding, and for comparison, the implementation of a processing operation in which a single item of data is read each time, rather than a dataset containing (a plurality of) data, is reproduced below. It is observed that 48 cycles are necessary.

Example 0 cycle #0: read A0;
cycle #1: read B0;
cycle #2: compute C0 and write C0;
cycle #3: read A1;
cycle #4: read B1;
cycle #5: compute C1 write C1;
. . .
cycle #45: read A15;
cycle #46: read B15;
cycle #47: compute C15 and write C15.

In example 1 (18 cycles), it is noted that the first two cycles #0 and #1 constitute initialization cycles. The number I of initialization cycles corresponds to the number of operands per computing operation. Next, a pattern of four successive cycles is repeated four times. For example, cycles #2 to #5 together form a pattern. The number of cycles per pattern corresponds to the number D of data per dataset, whereas the number of patterns corresponds to the number E of datasets to be processed. The total number of cycles may therefore be expressed as follows: I+D*E.

Achieving good performance is tantamount to reducing the total number of cycles to a minimum. In the conditions under consideration, that is to say 16 elementary and independent operations each able to be implemented over one cycle, the optimum number of cycles therefore appears to be equal to that number of elementary operations (16) plus the initialization phase (2 cycles), that is to say a total of 18 cycles.

In one variant, it is considered that the number of data accessible (in read mode or in write mode) in a single cycle (the number D of data per dataset) is equal to three (and not four), for example due to hardware limitations. The sequence of cycles may then for example be broken down as follows:

an initialization phase of 2 cycles; and then
5 patterns of 3 cycles for a total of 15 elementary computing operations out of the 16 to be performed; and then
a final cycle for computing and recording the result of the last elementary computing operation.

Example 2 cycle #0: read AA0_2={A0; A1; A2};
cycle #1: read BB0_2={B0; B1; B2};
cycle #2: compute C0 (from the set CC0_2={C0; C1; C2}) and read AA3_5 (forming for example a cycle i);
cycle #3: compute C1 (from the set CC0_2) and read BB3_5 (forming for example a cycle i);
cycle #4: compute C2 (from the set CC0_2) and write CC0_2;
cycle #5: compute C3 (from the set CC3_5) and read AA6_8 (forming for example a cycle ii);
cycle #6: compute C4 (from the set CC3_5) and read BB6_8 (forming for example a cycle ii);
cycle #7: compute C5 (from the set CC3_5) and write CC3_5 (forming for example a cycle ii);
cycle #8: compute C6 (from the set CC6_8) and read AA9_11;
cycle #9: compute C7 (from the set CC6_8) and read BB9_11;
cycle #10: compute C8 (from the set CC6_8) and write CC6_8;
cycle #11: compute C9 (from the set CC9_11) and read AA12_14;
cycle #12: compute C10 (from the set CC9_11) and read BB12_14;
cycle #13: compute C11 (from the set CC9_11) and write CC9_11;
cycle #14: compute C12 (from the set CC12_14) and read A15 (forming for example a cycle i);
cycle #15: compute C13 (from the set CC12_14) and read B15 (forming for example a cycle i);
cycle #16: compute C14 (from the set CC12_14) and write CC12_14;
cycle #17: compute C15 (isolated item of data) and write C15 (forming for example a cycle ii).

In example 2, it is observed that each cycle includes a memory access operation (in read mode or in write mode). It is therefore understood that, if the number D of data accessible in a single cycle is strictly less than three, then additional cycles will be necessary to perform memory access operations. The optimum of 18 cycles for 16 elementary operations will therefore no longer be achieved. However, even if the optimum is not achieved, the number of cycles remains significantly lower than the number of cycles necessary in example 0. An embodiment in which the datasets comprise two items of data exhibits an improvement over what currently exists.

In example 1, if cycles #2 and/or #3 correspond for example to a cycle i as defined above, then each of the cycles #6, #7, #8 and #9 corresponds to a cycle ii. Of course, this may be transposed from pattern to pattern. In example 2, if cycles #2 and/or #3 correspond for example to a cycle i as defined above, then each of the cycles #5, #6 and #7 corresponds to a cycle ii. Of course, this may be transposed from pattern to pattern.

In the examples described until now, in particular examples 1 and 2, the low total number of cycles is achieved in particular since a maximum number of memory access operations is implemented per dataset containing (a plurality of) data, rather than at the unit and in parallel with computing operations. Thus, for some parts of the process (for all of the parts in the optimized examples), the read operation on all of the necessary operands may be achieved even before the preceding elementary computing operation has ended. Computing power is preferably saved in order to perform a computing operation and record (write operation) the result of said computing operation in a common computing cycle (cycle #5 in example 1 for example).

In the examples, the advance reading of the operand data is implemented throughout the process (repeated from one pattern to another). The operands necessary for the computing operations performed during a pattern are automatically obtained (read) during the temporally previous pattern. It will be noted that, in degraded embodiments, the advance reading is implemented only in part (only for two successive patterns). Such a degraded mode in comparison with the above examples exhibits better results than existing methods.

In the examples described until now, it has been recognized that the data were read before serving as operands. In some embodiments, the data read in advance are read randomly, or at least independently of the future computing operations to be performed. Thus, at least some of the data read in advance from among the datasets effectively correspond to operands for subsequent computing operations, whereas other read data are not operands for subsequent computing operations. For example, at least some of the read data may be subsequently erased from the registers 11 without having been used by the ALUs 9, typically erased by other data recorded subsequently on the registers 11. Some data are therefore needlessly read (and needlessly recorded on the registers 11). However, it is enough for at least some of the data from the read datasets to effectively be operands in order to achieve a saving in terms of computing cycles, and the situation is therefore improved in comparison with what currently exists. Therefore, depending on the number of data to be processed and on the number of cycles, it is likely (in the mathematical sense of the term) that at least some of the pre-fetched data will effectively be able to be used as operand in a computing operation performed by an ALU 9 in a following cycle.

In some embodiments, the data read in advance are preselected, depending on the computing operations to be performed. This makes it possible to improve the relevance of the pre-fetched data. Specifically, in the examples with 16 elementary computing operations above, each of the 16 elementary computing operations requires, at input, a pair of operands, respectively A0 and B0; A1 and B1; . . . ; A15 and B15. If the data are read randomly, then the two first cycles could correspond to the read operation on AA0_3 and BB4_7. In such a case, no complete operand pair is available on the registers 11 at the end of the first two cycles. Therefore, the ALUs 9 are not able to implement any elementary computing operation in the following cycle. One or more additional cycles would therefore necessarily be consumed for memory access operations before the elementary computing operations are able to start, thereby increasing the total number of cycles and being detrimental to efficiency.

Counting the chance and the probabilities of the data obtained in read mode being as relevant as possible is enough to improve what currently exists, but is not fully satisfactory. The situation is able to be further improved.

Implementing a prefetch algorithm makes it possible to obtain all of the operands of the next computing operation to be performed as early as possible. In the above example, reading AA0_3 and BB0_3 during the first two cycles makes it possible for example to make all of the operands necessary to implement 4 first elementary computing operations available on the registers 11.

Such an algorithm receives, as input parameters, information data relating to the computing operations to be performed subsequently by the ALUs 9, and in particular relating to the necessary operands. Such an algorithm makes it possible, at output, to select the data read (per set) in anticipation of future computing operations to be performed. Such an algorithm is for example implemented by the control unit 5 when controlling memory access operations.

According to a first approach, the algorithm imposes organization of the data as soon as they are recorded in the memory 13. For example, the data for which it is desired to form a dataset are juxtaposed and/or ordered such that the entire dataset is able to be called by a single request. For example, if the addresses of the data A0, A1, A2 and A3 are referenced respectively @A0, @A1, @A2 and @A3, then the memory interface 15 may be configured, in response to a read request on @A0, so as to automatically also read the data at the following three addresses @A1, @A2 and @A3.

According to a second approach, the prefetch algorithm provides, at output, memory access requests that are adapted on the basis of the computing operations to be performed subsequently by the ALUs 9, and in particular relating to the necessary operands. In the above examples, the algorithm identifies for example that the data to be read as a priority are those of AA0_3 and BB0_3 in order to enable, as early as the following cycle, the elementary computing operations giving the result CC0_3, that is to say computing C0 with the operands A0 and B0, computing C1 with the operands A1 and B1, computing C2 with the operands A2 and B2 and computing C3 with the operands A3 and B3. The algorithm therefore provides, at output, memory access requests that are constructed so as to generate the read operation on AA0_3 and BB0_3.

The two approaches may optionally be combined with one another: the algorithm identifies the data to be read and the control unit 5 deduces therefrom memory access requests at the memory interface 15 in order to obtain said data, the requests being adapted on the basis of the features (structure and protocol) of the memory interface 15.

In the above examples, in particular examples 1 and 2 hereinabove, the number of ALUs assigned to the elementary computing operations is not defined. A single ALU 9 may perform all of the elementary computing operations, cycle by cycle. The elementary computing operations to be performed are also able to be distributed over a plurality of ALUs 9 of a PU, for example four. In such cases, coordinating the distribution of the computing operations over the ALUs with the technique of grouping together the data to be read in each read operation may make it possible to further improve efficiency. A distinction is made between two approaches.

In a first approach, the data read in an operation form operands in computing operations implemented by just one and the same ALU 9. For example, the groups AA0_3 and BB0_3 of data A0, A1, A2, A3, B0, B1, B2 and B3 are read first and a first ALU is made responsible for computing CC0_3 (C0, C1, C2 and C3). The groups AA4_7 (A4, A5, A6, A7) and BB4_7 (B4, B5, B6 and B7) are then read, and a second ALU is made responsible for computing CC4_7 (C4, C5, C6 and C7). It is then understood that the first ALU will be able to start implementing the computing operations before the second ALU is able to do the same, since the operands necessary for the computing operations of the first ALU will be available on the registers 11 before the operands necessary for the computing operations of the second ALU are. The ALUs 9 of a PU then operate in parallel and asynchronously.

In a second approach, the data read in an operation form operands in computing operations each implemented by different ALUs 9, for example four. For example, two groups of data including respectively A0, A4, A8 and A12; B0, B4, B8 and B12 are read first. A first ALU is made responsible for computing C0, a second ALU is made responsible for computing C4, a third ALU is made responsible for computing C8 and a fourth ALU is made responsible for computing C12. It is then understood that the four ALUs will be able to start implementing their respective computing operation substantially simultaneously, since the necessary operands will be available on the registers 11 at the same time as they are downloaded in a common operation. The ALUs 9 of a PU operate in parallel and synchronously. Depending on the types of computing operations to be performed, the accessibility of the data in memory and the available resources, one or the other of the two approaches may be preferred. The two approaches may also be combined: the ALUs may be organized into subgroups, the ALUs of a subgroup operating synchronously and the subgroups operating asynchronously with respect to one another.

In order to impose synchronized, asynchronous or mixed operation of the ALUs, the grouping together of the data to be read per read operation should be selected so as to correspond to the distribution of the assignments of the computing operations to various ALUs.

In the above examples, the elementary computing operations are independent of one another. The order in which they are performed therefore does not have any importance a priori. In some applications for which at least some of the computing operations are dependent on one another, the order of the computing operations may be specific. Such a situation typically arises in the context of recursive computing operations. In such cases, the algorithm may be configured so as to identify the data to be acquired (read) as a priority. For example, if:

the result C1 is obtained through a computing operation of which one of the operands is C0, C0 itself being obtained from the operands A0 and B0, the result C5 is obtained through a computing operation of which one of the operands is C4, C4 itself being obtained from the operands A4 and B4, the result C9 is obtained through a computing operation of which one of the operands is C8, C8 itself being obtained from the operands A8 and B8, and the result C13 is obtained through a computing operation of which one of the operands is C12, C12 itself being obtained from the operands A12 and B12, then the algorithm may be configured so as to read, during the first two initialization cycles #0 and #1, the datasets defined as follows:

{A0; A4; A8; A12}, and

{B0; B4; B8; B12}.

The dataset thus defined is shown in FIG. 4. Figuratively, it may be stated that the data are grouped together "in rows" in the embodiment shown in FIG. 3 and grouped together "in columns" in the embodiment shown in FIG. 4. Implementing the algorithm thus makes it possible to read the operands useful for the priority elementary computing operations and to make them available on the registers 11. In other words, implementing the algorithm makes it possible to increase the short-term relevance of the read data in comparison with a random read operation.

The disclosure is not limited to the examples of processing units and methods described above, only by way of example, but rather incorporates all variants that a person skilled in the art will be able to contemplate within the scope of protection that is sought. The disclosure also relates to a set of processor-implementable machine instructions for obtaining such a computing device, such as a processor or a set of processors, to the implementation of such a set of machine instructions on a processor, to the processor architecture management method implemented by the processor, to the computer program comprising the corresponding set of machine instructions, and to the recording medium on which such a set of machine instructions is computationally recorded.

The invention claimed is:

1. A computing device comprising:
a plurality of arithmetic logic units;
a set of registers able to supply data of operand type to the inputs of said arithmetic logic units and able to be supplied with data from the outputs of said arithmetic logic units;
a memory;
a memory interface by way of which data are transmitted and routed between the registers and the memory;
a control unit configured so as to control the arithmetic logic units in accordance with a processing chain microarchitecture such that the arithmetic logic units perform computing operations in parallel with one another, the control unit furthermore being designed to control the memory access operations by way of the memory interface, said control operations generating:
at least one cycle i including both implementing at least one first computing operation by way of an arithmetic logic unit and downloading a first dataset from the memory to at least one register;
at least one cycle ii, following the at least one cycle i, including implementing a second computing operation by way of an arithmetic logic unit, for which second computing operation at least part of the first dataset forms at least one operand,
content of said first dataset to download being selected to comprise at least one operand of said second computing operation, and the number of data of the downloaded first dataset being selected to comprise the maximum of the data that can be read during a single cycle such that it further comprises data which are not identified as operands of next computing operations.

2. The device as claimed in claim 1, wherein the control unit is furthermore configured, prior to controlling the arithmetic units and the memory access operations, so as to implement an identification algorithm for identifying the first dataset to be downloaded during the at least one cycle i on the basis of the second computing operation to be implemented during the at least one cycle ii.

3. The device as claimed in claim 1, wherein the control unit is configured so as to implement two cycles i separate from one another, such that two first datasets separate from one another are downloaded to at least one register, at least part of each of the two first datasets forming an operand for the second computing operation of the at least one cycle ii.

4. The device as claimed in claim 1, wherein the control unit is configured so as to implement a plurality of cycles ii separate from one another, and such that the part of the first dataset forming at least one operand for the second computing operation of a cycle ii is different from one cycle ii to another cycle ii of the plurality.

5. The device as claimed in claim 1, wherein the control unit is configured so as to perform at least two iterations of a series of at least one cycle i, and one cycle ii, said two iterations being at least partly superimposed such that at least one cycle ii of the first iteration forms a cycle i of the following iteration.

6. The device as claimed in claim 1, wherein the control unit is configured so as to precede a first cycle i with an initialization phase including downloading, from the memory to at least one register, at least one dataset forming operands for the first computing operation of said first cycle i.

7. The device as claimed in claim 1, wherein the control unit is furthermore designed to control the memory access operations by way of the memory interface, such that said control operations generate:
during a cycle i, the implementation of a plurality of first computing operations by a plurality of arithmetic logic units;
during a cycle ii, the implementation of a plurality of second computing operations by a plurality of arithmetic logic units,
the grouping of the data per dataset to be downloaded being selected so as to match a distribution of the assignments of the computing operations to each of the arithmetic logic units of the plurality, such that said arithmetic logic units have synchronized, asynchronous or mixed operation.

8. A data processing method implemented by a control unit of a computing device, said device comprising:
- a plurality of arithmetic logic units;
- a set of registers able to supply data of operand type to the inputs of said arithmetic logic units and able to be supplied with data from the outputs of said arithmetic logic units;
- a memory;
- a memory interface by way of which data are transmitted and routed between the registers and the memory;
- the control unit configured so as to control the arithmetic logic units in accordance with a processing chain microarchitecture such that the arithmetic logic units perform computing operations in parallel with one another, the control unit furthermore being designed to control the memory access operations by way of the memory interface;
- said method comprising at least:
- generating a cycle i including both implementing at least one first computing operation by way of an arithmetic logic unit and downloading a first dataset from the memory to at least one register;
- generating a cycle ii, following the cycle i, including implementing a second computing operation by way of an arithmetic logic unit, for which second computing operation at least part of the first dataset forms at least one operand,
- the content of said first dataset to download being selected to comprise at least one operand of said second computing operation, and the number of data of the downloaded first dataset being selected to comprise the maximum of the data that can be read during a single cycle such that it further comprises data which are not identified as operands of next computing operations.

9. A non-transitory computer program comprising instructions for implementing the method as claimed in claim 8 when this program is executed by a processor.

10. A non-transient computer-readable recording medium on which there is recorded a program for implementing the method as claimed in claim 8 when this program is executed by a processor.

* * * * *